Figure 1:
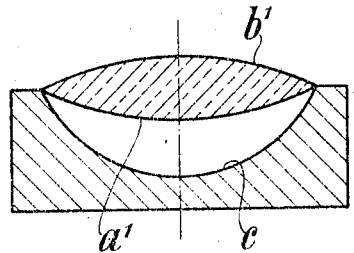

R. STRAUBEL.
PROCESS OF PRODUCING LENSES.
APPLICATION FILED APR. 1, 1909.

1,048,227.

Patented Dec. 24, 1912.

Witnesses.

Inventor:
Rudolf Straubel

UNITED STATES PATENT OFFICE.

RUDOLF STRAUBEL, OF JENA, GERMANY, ASSIGNOR TO FIRM OF CARL ZEISS, OF JENA, GERMANY.

PROCESS OF PRODUCING LENSES.

1,048,227.           Specification of Letters Patent.    Patented Dec. 24, 1912.

Application filed April 1, 1909. Serial No. 487,254.

*To all whom it may concern:*

Be it known that I, RUDOLF STRAUBEL, a citizen of the German Empire, and residing at Carl-Zeiss strasse, Jena, in the Grand Duchy of Saxe-Weimar, Germany, have invented a new and useful Process of Producing Lenses, of which the following is a specification.

The invention relates to the manufacture of glass lenses which have only one spherical surface, while the other one is a non-spherical surface of revolution, the axis of which passes through the middle point of the sperical surface. Under lenses are also to be understood those bodies of revolution which are to be silvered on one surface, so that this surface may act as a reflecting surface. The expression spherical surface is intended to include the special case of a plane surface.

A proposal has already appeared in the Patent Specification No. 4786 (Paine, October 3, 1846, lens perfector) of overcoming the difficulty of manufacturing the non-spherical surface in the kind of lenses described, by first of all producing a lens of deviating form with two spherical surfaces and thereupon transforming this primary lens into one of the desired form by subsidence by heat, the mold surface being spherical and differing from the spherical lens surface to be produced only in the algebraic sign of the radius. As far as the dimensions of the primary lens are concerned, its thicknesses at the vertex and at the margin are not at all or inappreciably different from the respective thicknesses of the final lens, its two radii, however, have to be suitably selected. Hence in the process proposed by Paine there are two elements employed as independent variables: the radii of the primary lens. A closer investigation of this process shows, that the selection of the two radii is insufficient to produce a lens with a spherical surface of a prescribed radius and a non-spherical surface of revolution of a prescribed profile, even though only profile curves be admitted for the latter surface, the radius of which increases or decreases steadily from the vertex to the margin. This known process is therefore in the present invention developed, so that the calculated or otherwise given profile curve of the surface of revolution can be realized with greater approach to accuracy than heretofore. If obtaining the spherical surface of the final lens immediately by the mold be dispensed with, and the course be rather to produce the final spherical surface after subsidence by grinding, the radius of the spherical mold surface offers itself as a third element which may be selected, a third independent variable. It will be noticed, that while enhancing in this way the accuracy obtainable for the non-spherical surface of the final lens, the number of the steps of the process is increased by one: the grinding of the spherical surface of the final lens.

Four forms of the new process can be differentiated, according as on the one hand the mold surface be concave or convex and on the other as its radius be shorter or longer than the radius of the final spherical surface. In two of these four cases, namely, a convex mold surface of enlarged radius and a concave mold surface of diminished radius, producing the final spherical surface by grinding can only be carried out, when the thickness at the vertex of the primary lens has been correspondingly enlarged. In the other two cases the marginal thickness of the primary lens must be correspondingly greater than that of the final lens. Finally, in order to obtain in the final lens the greatest approximation to the prescribed profile of the surface of revolution, the mold surface can be formed as a suitable non-spherical surface of revolution instead of according to a radius of a sphere to be selected. Its profile curve is to be derived from that of the non-spherical lens surface, the dimensions of the primary lens being taken into consideration, as is more particularly described below. Since the lens surface formed immediately from the mold surface is no final one, the production of the mold surface can be restricted to turning the mold in a lathe according to its profile curve. On account of this simple preparation of the mold surface the new process also in the last considered form can, in place of producing the non-spherical surface of revolution of the lens by grinding, still be employed with advantage, even when only one individual lens has to be produced.

In consequence of the perfect adaptability of the profile of the non-spherical mold surface on the profile of the non-spherical lens surface to be indirectly obtained, the selection of the radii of the primary lens loses its importance. It only serves the purpose of avoiding too great deviations of the lens surface formed on the mold surface from the final spherical surface. When the final lens shows no great difference between the marginal thickness and the thickness at the vertex, a plano-parallel disk can form the primary lens. If many final lenses of this kind be intended to be produced, a multiplex mold with mold surfaces lying adjacent to each other and instead of single plano-parallel disks a plano-parallel plate covering the whole mold may be employed.

The selection of the radii of the spherical surfaces and the determination of the non-spherical mold surface can in the first place be proceeded with graphically under the assumption, that during subsidence each point of the primary lens moves parallel to the lens axis and that all points of equal distance from the axis travel equal ways, so that the thickness of the lens measured at any distance from and parallel to the axis after subsidence is the same as before subsidence. The greater the change of form of the lens produced by subsidence, by so much the more the practical result deviates from what resulted on paper, by so much the more therefore the dimensions obtained graphically of the primary lens and of the mold surface need rectification based on experience.

In the cases where the primary lens rests with its margin on the edge of the mold surface, a difference in pressure between the two fluid media above and below the lens can as is well known be made to assist subsidence and thereby not only subsidence be hastened, but also the temperature employed reduced.

Figure 2:
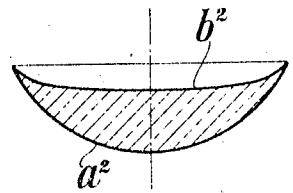
Figure 3:
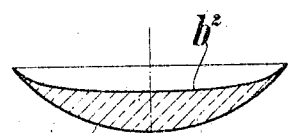
Figure 4:
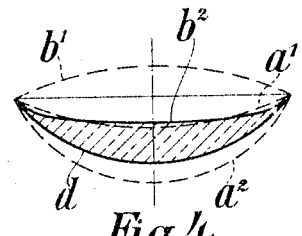
Figure 5:
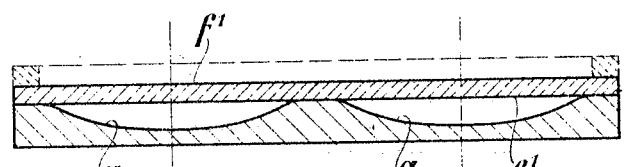
Figure 6:
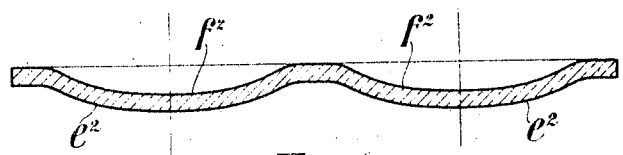
Figure 7:
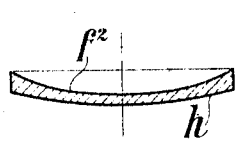
Figure 8:
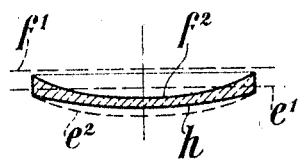

In the annexed drawing: Figure 1 is a section through a primary lens and a mold supporting it. Fig. 2 is a section through the same lens as molded by subsidence. Fig. 3 is a section through the same lens after the final spherical surface has been produced. Fig. 4 is the same section with the lens profiles from Figs. 1 and 2 shown in dotted lines. Fig. 5 is a section through a duplex primary lens and a mold supporting it. Fig. 6 is a section through the same duplex lens as molded by subsidence. Fig. 7 is a section of a lens cut out from the duplex lens shown in Fig. 6 and provided with the final spherical surface. Fig. 8 is the same section with the lens profiles from Figs. 5 and 6 shown in dotted lines.

In the example of the new process, to which Figs. 1 to 4 are relative, the production of a collective meniscus by means of a spherical mold surface is dealt with, and in Figs. 5 to 8 dispersive menisci are produced with the aid of a duplex mold, the two mold surfaces of which are made after the same non-spherical surface of revolution. The primary lens shown in Fig. 1, being a symmetrical double convex lens, the surfaces $a^1$ and $b^1$ of which are spherical, is laid upon a mold with concave spherical mold surface $c$. The result of the subsidence is to be seen from Fig. 2. A meniscus is the outcome, the upper surface $b^2$ of which closely approximates to the prescribed non-spherical surface of revolution, while its lower surface $a^2$ corresponds exactly to the spherical mold surface $c$. The lens has now to be ground, in order to replace the surface $a^2$ by the final spherical surface $d$, which, as shown in Fig. 3, is weaker convex, so that the final lens $d\ b^2$ with equal diameter and with the same marginal thickness zero has a smaller vertex thickness than the primary lens $a^1\ b^1$. In Fig. 4 the changes undergone by the lens are given at one view. If the primary lens had been already given the final vertex thickness and the mold surface the weaker curvature corresponding to the final spherical surface $d$, grinding would have been saved, the known process mentioned in the first paragraph above only being applied. It is, however, easily seen from Fig. 4, that in this case a non-spherical surface of revolution would have resulted, the profile of which had differed from that of the surface $b^2$ by a smaller vertex radius and a slower reduction of the radius toward the margin of the lens.

In the example according to Figs. 5 to 8 two similar primary lenses each with two spherical surfaces of infinitely large radius are contained in a glass plate with parallel plane surfaces $e^1$ and $f^1$. This plano-parallel plate is according to Fig. 5 laid upon a mold having two similar, concave, non-spherical surfaces of revolution $g\ g$ and may be held firmly in position at the margins by a frame (shown in dotted lines). After subsidence the plate has taken up the form represented in Fig. 6, in which it contains two lenses each with a final non-spherical concave surface $f^2$ of prescribed profile and a similar convex surface $e^2$, which is immediately produced from the concave mold surface $g$. The cutout lens in Fig. 7 presents already in place of the surface $e^2$ the final spherical surface $h$ produced by grinding.

I claim:

1. Process of producing a lens of the two refracting surfaces of which one is a prescribed spherical surface and the other a non-spherical surface of revolution of a profile approximate to a prescribed one, this process consisting in manufacturing a primary totally spherical lens, preparing a mold with a surface which differs from the prescribed spherical surface, placing the lens upon this mold, rendering it subsident thereupon by heat and substituting by grinding the prescribed spherical surface for that lens surface which was in contact with the mold surface, the form of the said primary lens and the amount of the difference between the mold surface and the prescribed spherical surface being chosen so as to cause the non-spherical surface of revolution of the final lens to approximate after subsidence as closely as possible to the prescribed non-spherical surface of revolution.

2. Process of producing a lens of the two refracting surfaces of which one is a prescribed spherical surface and the other a non-spherical surface of revolution of a prescribed profile, this process consisting in manufacturing a primary totally spherical lens, preparing a mold with a non-spherical surface of revolution, placing the lens upon this mold, rendering it subsident thereupon by heat and substituting by grinding the prescribed spherical surface for that non-spherical lens surface which was in contact with the mold surface, the form of the said primary lens and the amount of the difference between the mold surface and the prescribed spherical surface being chosen so that the non-spherical surface of revolution of the final lens will correspond with the prescribed non-spherical surface of revolution.

RUDOLF STRAUBEL.

Witnesses:
 PAUL KRÜGER,
 FRITZ SAUDER.